April 10, 1928.
P. DANCKWARDT
1,665,406
METHOD OF RECOVERING ALUMINUM CHLORIDE FROM SLUDGE
Filed April 23, 1927
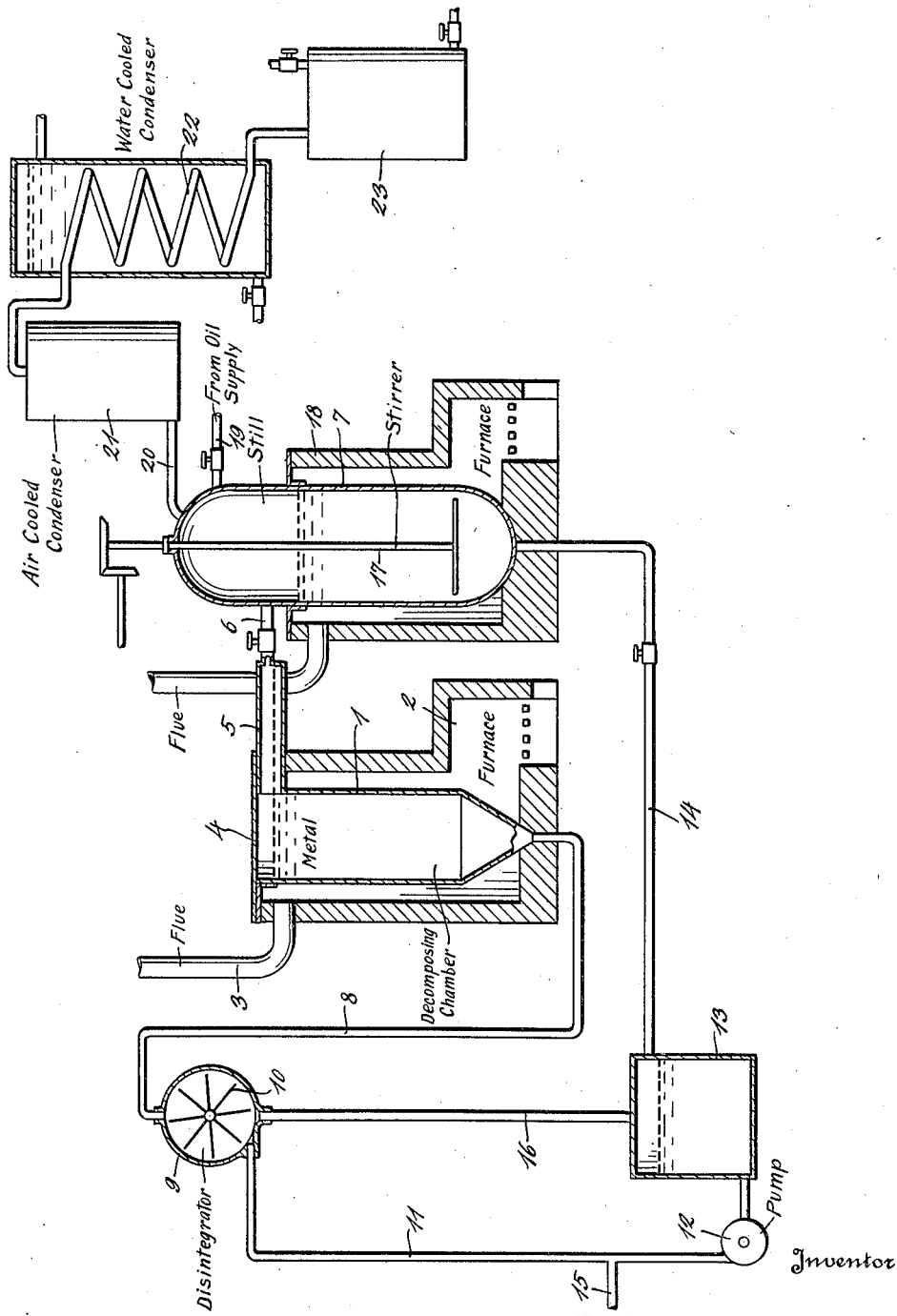
Paul Danckwardt.
By H. J. O'Brian
Attorney Patented Apr. 10, 1928.

1,665,406

UNITED STATES PATENT OFFICE.

PAUL DANCKWARDT, OF LA JUNTA, COLORADO.

METHOD OF RECOVERING ALUMINUM CHLORIDE FROM SLUDGE.

Application filed April 23, 1927. Serial No. 186,054.

This invention relates to a process for recovering aluminum chloride from "sludge", the residue left when oil is treated with aluminum chloride. In this residue the aluminum chloride is in a changed state. It has lost the capacity for further converting oil into gasoline. The invention, hereinafter described, relates to a method for regenerating the spent aluminum chloride and reviving its catalytic properties, so that it may be used in place of freshly prepared aluminum chloride.

The invention, briefly stated, consists in forcing the sludge, as a fluid, through a body of molten metal, and to thereby establish an instantaneous and perfect reaction. The two substances must be brought together, intimately and in a finely divided state. Otherwise, as in the former processes for treating sludge with a view of recovering the aluminum chloride, it will occur that the compound of aluminum chloride and hydrocarbon will be decomposed in a different direction. For in slowly heating the compound in bulk form, it has been found that the sublimation of aluminum chloride soon ceases altogether. The aluminum chloride is split up partly into aluminum and chlorine. The latter will combine with hydrogen of some of the hydrocarbon and the aluminum will partly turn into carbide and partly into oxide, if the heating takes place in the presence of air.

Under the conditions as indicated above, however, the high temperature of the molten metal causes the fine particles of the sludge to burst explosively into vapor and the decomposition following is so thorough that the compound breaks up into carbon, carbohydrates and aluminum chloride, because the chlorine (or HCL if intermediately formed) has no difficulty in getting into direct contact with the aluminum, or the aluminum carbide, if such should be formed intermediately without any protecting layer separating particle from particle. While the process may be carried on in any suitable container in which metal can be heated sufficiently to bring it into the molten state, and some kind of a condenser, I will describe in the following, one form of apparatus, in which the regenerated aluminum chloride is sublimed directly into a still, and which is provided with special means for disintegrating mechanically the aluminum chloride hydrocarbon compound before it is brought into contact with the molten metal. In this way the regeneration is most perfect and forms a step in the treatment of oil with aluminum chloride and thereby saving considerable handling. The single figure of the drawing represents a longitudinal vertical section through the whole apparatus.

In this drawing numeral 1 designates an iron cylindrical vessel in which the metal is to be heated and 2 the fire place which is provided with a flue 3. The vessel is provided with a removable iron cover 4 and has a spacious extension 5 through which the flow of the vapors is slow to facilitate the settling of the carbon. This extension is connected by means of the valved pipe 6 with a still 7. The bottom of the vessel 1, which will hereinafter be referred to as the decomposing chamber, is connected by means of a pipe 8 with the top of a mechanical disintegrator 9. The latter consists of an iron casing in which the armed wheel 10 rotates when gas is blown into it through pipe 11. This pipe connects the disintegrator, through a pump 12, with a tank 13 containing the sludge in a fluid state. The sludge may be conveyed from a still 7 directly to the tank 13 by gravity (or by a pump not shown) directly through the valved pipe 14. Through the branch pipe 15 gases may be forced under considerable pressure along the line 11 into the disintegrator 9. From the latter fluid may be discharged by gravity into the tank 13 through pipe 16. The still 7 may be supplied with a stirrer of some kind, such, for instance, as illustrated by numeral 17. While generally stills for the aluminum chloride process are provided with stirrers, this is of little importance in this case, as the sludge is not intended to remain in the still until worked out completely and until a lot of carbon has separated out. A fireplace 18 supplies the necessary heat, and a valved pipe 19 serves for the introduction of oil and chemicals. Another pipe 20 forms the vapor line and leads to an air cooled condenser 21 which in turn is connected with a water-cooled condenser 22, from which the condensed gasoline flows into a receiving tank 23.

In order to carry out the process in apparatus above described, I remove the cover plates and fill vessel 1 with lead or any other suitable metal or alloy of proper melting point, I then replace the cover and start to blow some hydrocarbon gas into the vessel through pipes 15 and 11. When all the air in the apparatus is replaced by gas, I start the fire under the decomposer. The level of the metal when melted ought to be so high that it covers the bottom of the extension 5 in order to keep it hot enough to prevent condensation of the aluminum chloride in that part of the decomposer. The valve 6 is supposed to be open all the time during a run. The still 7 is preferably filled with oil and aluminum chloride before operation begins, but firing should not begin until the decomposer has been brought up to full heat. After the distillation has been carried on for some time and considerable sludge has gathered by gravity in the bottom part of the still the valve of line 14 is opened to allow a certain amount of sludge to flow continuously, as required, or at intervals, into tank 13. When this is nearly full, the pump 12 is started. The gas introduced through 15 flows into pipe 11. In order to prevent the sludge from solidifying, the gas, particularly in the beginning, may be preheated. The sludge and gas mingle in the upper part of the pipe 11 and under the impulse of the gas as it emerges wheel 10 will rotate at a very high speed. The effect of this is two-fold. The sludge is disintegrated mechanically and separated into two parts, one part of which is so fine that it floats in the gas current and is carried upwardly, while the remaining part is too heavy to be carried away, and will be centrifuged and gather at the periphery of the casing, from which it flows back to tank 13 by gravity, to be later returned into the disintegrator by the pump 12. As the tank 13, the disintegrator and the decomposer are all connected air-tight with each other by the several pipes, it is obvious that the mist of sludge carried by the hydrocarbon gas will have to pass from the disintegrator to the decomposer, where it strikes the melted metal and is churned against it on its escape upwardly to the surface. By reason of the high temperature of the metal and the intimate contact between heating medium and the infinitesimally small particles of the sludge, the latter are instantaneously changed into vapor and the solid carbon separates out, the latter is carried upwardly and is deposited on the surface of the metal in dust form and is easily removable when the process is discontinued, or the valve 6 may be closed thereby interrupting the introduction of gas and sludge temporarily, when the carbon is to be taken out.

By operating in the above way all the aluminum chloride contained as such in the sludge may be recovered and made available in the still 7 for reuse. Any aluminum metal combined with sulphur or oxygen that may be present in the sludge cannot, however, be recovered without adding to the charge in the disintegrator a certain amount of chlorine or hydrochloric acid to form chloride. If it is desired to recover this, I add the chlorine or hydrochloric acid to the gas introduced. The presence of chlorine or hydrochloric acid seems also to accelerate the reaction generally, besides completing it, but is otherwise not necessary. If too much chlorine is added, it may consume a certain amount of metal, the excess chlorine combining with the metal. As this chloride will float on top of the molten metal, it may make the carbon collecting there sticky and more difficult to remove. If aluminum is the metal used in the process, or an alloy of aluminum, the chloride formed from it will simply sublime along with the regenerated aluminum chloride, and no sticky fused chloride will then collect on the surface of the metal. In this case the amount of aluminum chloride in the still can be kept absolutely constant. If there is any loss of aluminum chloride, in a mechanical way or otherwise, it can be exactly replaced by adding the proper amount of chlorine or hydrochloric acid to form the necessary amount of aluminum chloride from the metal added to the contents of the decomposer.

As the sludge is a material difficult to handle, if it should happen to cool off, particularly after free carbon has already been formed in the still, I find it is best to remove it continuously from the still before it shows any deposit of gritty carbon, although the aluminum chloride may have become only partially inactive. In that state it is more fluid and can be handled better by the pumps.

I may emphasize that the process without the addition of chlorine or hydrochloric acid is capable of regenerating all the aluminum chloride present but during the process of distillation of oil with aluminum chloride it is unavoidable that slight amounts of free hydrochloric acid are formed and lost, that therefore a deficiency exists in the sludge and therefore all the aluminum metal present will not be changed to aluminum chloride. In the case of the oil containing sulphur, some aluminum will form sulphide or a complex organic sulphur compound. To replace this defficiency of chlorine and to recover any aluminum that may have combined with other elements, I propose to add the small amount of chlorine or hydrochloric acid, which will thus recover a part of the aluminum, though small, but otherwise lost. Besides this effect it seems also to accellerate the reaction. But I do not consider it an essential feature of the process, but only as an occasional advantageous modification.

It may also be stated specifically that, while the process as described in this specification forms a step in the distillation of oil with aluminum chloride, it may be used for the recovery of aluminum chloride from sludge independently of the distillation of oil. In that case the only change in apparatus would be the substitution of proper condensers for the products in place of the still.

Having thus described my invention, what I claim as new is:

1. The process of producing aluminum chloride, which consists in injecting "sludge", a compound of aluminum chloride and hydrocarbon, and a gas into a body of molten metal, and condensing the aluminum chloride.

2. The process of revivifying the catalytic power of aluminum chloride of the sludge formed by the treatment of oil with aluminum chloride and in which the aluminum chloride has become inactive, which consists in passing a fixed gas and the sludge in the fluid state, but as a mist, through a body of molten metal violently agitated, thereby causing the sludge to break up into carbon, aluminum chloride and hydrocarbon, the process to be carried out at such a speed that the carbon may settle out on the surface of the molten metal, where the temperature is too high for the aluminum chloride to condense and collecting the vapors of aluminum chloride in a body of oil for reuse.

3. The process of producing active aluminum chloride from an aluminum chloride hydrocarbon compound obtained in the distillation of oil with aluminum chloride, which consists in submitting the compound in the fluid state to a mechanical process of disintegration by blowing it together with hydrogen gas against a fast rotating wheel, returning always the less disintegrated part, forcing the finest part which is carried as a mist by the gas, through a body of molten metal, thereby causing instantaneous chemical disintegration and condensing the aluminum chloride.

4. The process of distilling oil with aluminum chloride and continuously regenerating the spent aluminum chloride, which consists in withdrawing during the distillation the aluminum chloride hydrocarbon formed continuously from the still, to prevent the formation of gritty carbon, disintegrating it mechanically by a blast of gases, simultaneously causing a separation of the part transformed into the finest mist from the less disintegrated part, which is allowed to run back to the supply tank for retreatment, forcing the finer part together with the gases through molten metal, and returning the volatilized aluminum chloride and hydrocarbon to the still.

5. The process of distilling oil with aluminum chloride and continuously regenerating the spent aluminum chloride, which consists in causing the spent aluminum chloride hydrocarbon compound continuously in a finely divided state to mix with chlorine containing gas, then subjecting the mixture of gases and finely suspended fluid to a higher temperature by passing them through molten metal, thereby causing instantaneous chemical reaction, returning the regenerated aluminum chloride and hydrocarbon to the still while the process of distillation is going on, and retaining the carbon formed separately.

6. The process of producing active aluminum chloride from the spent aluminum chloride obtained in the process of distilling oil with aluminum chloride, generally called "sludge", which consists in violently agitating the spent aluminum chloride with hydrocarbon vapor under pressure, separating the less finely divided portion of the sludge by centrifugal action for retreatment, forcing the finely divided portion and the vapors through molten metal at a temperature above that of the decomposition point of the sludge, but below that of the hydrocarbon vapor, and condensing the products formed.

7. The process of distilling oil with aluminum chloride, which consists in distilling the oil with aluminum chloride, withdrawing the aluminum chloride hydrocarbon compound formed from the still before the aluminum chloride is completely spent, disintegrating the partially spent aluminum chloride by hydrocarbon vapor under pressure, separating the less disintegrated heavier particles continuously from the finer, lighter particles, causing the former together with the hydrocarbon vapor to come into intimate contact with molten metal at a temperature below the decomposition point of the hydrocarbon vapor, and allowing the vapors formed to reenter the still.

8. The process of recovering aluminum chloride from the product obtained when oil is distilled with aluminum chloride, which consists in subjecting the product to the action of a hydrocarbon gas and chlorine, subjecting the product to the action of a disintegrator whereby the product is separated into two parts, one of which is in the form of a fine mist which contains aluminum and chlorine and forcing the mist-like part through molten metal whereby aluminum chloride is formed and condensing the aluminum chloride.

9. The process of regenerating the inactive aluminum chloride contained in the sludge obtained when oil is distilled with aluminum chloride which consists in subjecting the inactive aluminum chloride hydrocarbon compound to the action of a mechanical disintegrating device whereby it is in part reduced to a finely divided state, mixing chlorine gas with said finely divided part, subjecting the mixture to a high temperature by forcing the same through a body of molten metal whereby a chemical reaction takes place which revivifies the aluminum chlorid and transferring the regenerated aluminum chloride and hydrocarbon to a still while the latter is in operation.

10. The process of revivifying the inactive aluminum chloride contained in hydrocarbon aluminum chloride sludge formed when oil is distilled in the presence of aluminum chloride which consists in mixing a fixed gas with the sludge while the latter is in a fluid state, subjecting the mixture to the action of a mechanical disintegrator whereby a portion thereof is reduced to a mist, forcing said mist through a body of molten metal whereby the sludge is broken up into carbon, aluminum chloride and hydrocarbon, permitting the carbon to deposit on the upper surface of the molten metal and condensing the aluminum chloride vapors.

In testimony whereof I affix my signature.

PAUL DANCKWARDT.